United States Patent
LaHousse et al.

(10) Patent No.: US 11,332,102 B2
(45) Date of Patent: May 17, 2022

(54) APPARATUS, SYSTEM, AND METHOD FOR CONTROLLING LANDING GEAR

(71) Applicant: AIRman Products, LLC, Brighton, MI (US)

(72) Inventors: Shane R. LaHousse, Ann Arbor, MI (US); Christopher Domanski, Brighton, MI (US); Robert L. Allen, Linden, MI (US)

(73) Assignee: AIRman Products, LLC, Brighton, MI (US)

( * ) Notice: Subject to any disclaimer, the term of this patent is extended or adjusted under 35 U.S.C. 154(b) by 434 days.

(21) Appl. No.: 16/386,781

(22) Filed: Apr. 17, 2019

(65) Prior Publication Data

US 2020/0331439 A1 Oct. 22, 2020

(51) Int. Cl.
| | |
|---|---|
| *B60S 9/08* | (2006.01) |
| *B60S 9/06* | (2006.01) |
| *F16H 1/16* | (2006.01) |
| *B66F 3/18* | (2006.01) |
| *B60D 1/66* | (2006.01) |
| *F16H 57/039* | (2012.01) |
| *F16H 57/021* | (2012.01) |
| *F16H 25/20* | (2006.01) |

(52) U.S. Cl.
CPC . *B60S 9/06* (2013.01); *B60S 9/08* (2013.01); *F16H 1/16* (2013.01); *B60D 1/66* (2013.01); *B66F 3/18* (2013.01); *F16H 57/039* (2013.01); *F16H 2025/209* (2013.01); *F16H 2057/0213* (2013.01); *Y10T 74/19828* (2015.01)

(58) Field of Classification Search
CPC ...... B60S 9/06; B60S 9/08; B66F 3/18; F16H 1/16; F16H 2057/0213; F16H 57/039; B60D 1/66
USPC .......................................................... 74/425
See application file for complete search history.

(56) References Cited

U.S. PATENT DOCUMENTS

| | | | |
|---|---|---|---|
| 3,921,958 A * | 11/1975 | Brockelsby | ............... B60S 9/16 254/420 |
| 4,116,315 A | 9/1978 | Vandenberg | |
| 4,345,779 A | 8/1982 | Busby | |
| 5,050,845 A | 9/1991 | Aline et al. | |
| 5,451,076 A | 9/1995 | Burkhead | |
| 5,911,437 A | 6/1999 | Lawrence | |
| 6,010,154 A | 1/2000 | Payne et al. | |
| 6,086,099 A | 7/2000 | Kingsbury | |
| 6,224,103 B1 | 5/2001 | Hatcher | |
| 6,926,305 B2 | 8/2005 | Daniel | |
| 8,500,167 B2 | 8/2013 | Diaz | |
| 8,894,039 B2 | 11/2014 | Conaway | |
| 8,919,738 B2 | 12/2014 | Daniel | |
| 2009/0008917 A1 | 1/2009 | Daniel | |

(Continued)

FOREIGN PATENT DOCUMENTS

EP 0654385 5/1995

*Primary Examiner* — Mahdi H Nejad
(74) *Attorney, Agent, or Firm* — Bond, Schoeneck & King, PLLC

(57) ABSTRACT

A landing gear system and method of actuating the landing gear system, the system including a first leg assembly, a second leg assembly, a cross-shaft arranged between the two leg assemblies, and a landing gear actuator. The landing gear actuator includes a motor and a coupling shaft which is arranged to couple and decouple the landing gear actuator from the cross-shaft.

14 Claims, 8 Drawing Sheets

(56) References Cited

U.S. PATENT DOCUMENTS

2011/0089789 A1\* 4/2011 Tang ..................... H02K 5/225
310/68 B
2015/0175136 A1  6/2015 Griffin et al.

\* cited by examiner

APPARATUS, SYSTEM, AND METHOD FOR CONTROLLING LANDING GEAR

FIELD OF THE DISCLOSURE

The present disclosure is directed generally to landing gear assemblies, specifically to a landing gear actuator assembly for trailers.

BACKGROUND

Trailers for transporting goods are configured to be removably connectable with a tractor, which typically includes a power source, e.g., a gas-powered engine, which propels the combined tractor-trailer to its destination. The tractor and the trailer typically include a component or components for creating a releasable connection between the tractor and the trailer. A trailer can also include one or more pairs of rear wheels, where each pair of rear wheels is non-rotatably connected via an axle. Notably, the trailer may include retractable or telescoping landing gear, which can be positioned at the front of the trailer proximate the component or components which establish the releasable connection with the tractor. When a tractor-trailer is transporting goods the axles of the tractor and the connection with the tractor keep the trailer level and stable and the landing gear is retracted. However, once the tractor-trailer reaches its destination and the operator of the tractor disconnects the tractor from the trailer, the landing gear is expanded and, while in the expanded state, is used to keep the trailer substantially level.

Generally, landing gear systems are manually operated, i.e., actuated between the retracted state and the expanded state, via a manual hand crank. The process of operating the landing gear system takes time and effort from the operator. Furthermore, manual operation of landing gear systems from the retracted state to the expanded state via a manual hand crank may place the operator of the tractor at risk of injury.

SUMMARY OF THE DISCLOSURE

The present disclosure is related to actuators for landing gear systems for trailers. Specifically, a system and method are provided which include a landing gear actuator assembly arranged to transition, in response to a remote input, a first leg assembly and a second leg assembly from a retracted state to an expanded state and vice versa.

Accordingly, in an aspect, there is provided a landing gear actuator assembly, the landing gear actuator assembly includes a housing having a cavity, where the cavity includes a worm hub operatively arranged to rotate about a first imaginary rotational axis and within the cavity of the housing, the worm hub having a first outer circumferential surface having a first plurality of gear teeth arranged thereon and a first through-bore substantially parallel with the first imaginary rotational axis; and a worm gear having a second outer circumferential surface having at least one gear tooth arranged to engage with the first plurality of gear teeth of the worm hub. The landing gear actuator assembly also includes a coupling shaft arranged through the housing and within the first through-bore of the worm hub and substantially parallel to the first imaginary rotational axis; a motor arranged to provide a first rotational force to the worm gear, wherein first rotational force of the motor induces a rotation of the worm gear within the housing and transfers the first rotational force to the worm hub.

In an aspect, the coupling shaft further includes a first sensor arranged to measure the number of rotations of the coupling shaft.

In an aspect, the worm hub comprises a first axial worm hub portion and a second axial worm hub portion, the first axial worm hub portion further comprising an annular recess arranged about the first imaginary rotational axis, the second axial worm hub portion comprising the through-bore, and the housing further comprises a first input port for receiving a first input.

In an aspect, the annular recess comprises a clutch assembly, the clutch assembly comprising a first plate and a first friction disc.

In an aspect, the coupling shaft is non-rotatingly engaged with the first plate of a clutch assembly.

In an aspect, the annular recess of the first axial worm hub portion further comprises a piston-clutch actuator displaceable in a first axial direction parallel with the first imaginary rotational axis and arranged to impart a first axial force on the clutch assembly.

In an aspect, the worm hub or the coupling shaft further comprises a resilient member arranged to impart a second axial force opposite the first axial force on the piston-clutch actuator in a second axial direction opposite the first axial direction.

In an aspect, the piston-clutch actuator comprises a third outer circumferential surface, wherein the third outer circumferential surface comprises a first annular sealing member.

In an aspect, the second axial worm hub portion further comprises a fourth outer circumferential surface, the fourth outer circumferential surface having an annular groove arranged thereon, the annular groove arranged to receive the first input from the first input port of the housing.

In an aspect, the second axial worm hub portion further comprises at least one channel arranged between the annular groove of the second axial worm hub portion and the annular recess of the first axial worm hub portion.

In an aspect, the second axial worm hub portion further includes a second annular sealing member about the fourth outer circumferential surface and in the first axial direction with respect to the annular groove, and a third annular sealing member arranged about the fourth outer circumferential surface and in a second axial direction where the second axial direction is opposite the first axial direction.

In an aspect, there is provided a landing gear system, the system includes a first leg assembly including a first leg housing, a first leg arranged to telescopingly engage with the first leg housing, and a first leg gear arranged to transfer a rotational motion to the first leg. The landing gear system also includes a second leg assembly including a second leg housing, a second leg arranged to telescopingly engage with the second leg housing, and a second leg gear arranged to transfer the rotational motion to the second leg. The system also includes a cross-shaft arranged between the first leg assembly and the second leg assembly and a landing gear actuator assembly secured to the first leg assembly, the second leg assembly, or the cross-shaft. The landing gear actuator assembly includes a motor and a coupling shaft, wherein the coupling shaft is arranged to couple and decouple the motor from the cross-shaft.

In an aspect, the landing gear actuator assembly also includes a housing having a cavity, the cavity including a worm hub operatively arranged to rotate about a first imaginary rotational axis within the cavity of the housing, the worm hub having a first outer circumferential surface having a first plurality of gear-teeth arranged thereon and a first through-bore substantially parallel with the first imaginary rotational axis and the cross-shaft, and a worm gear having a second outer circumferential surface having at least one gear tooth arranged to engage with the first plurality of gear teeth of the worm hub. Additionally, the motor is arranged to produce a first rotational force wherein the first rotational force induces a rotation of the worm gear within the housing and transfers the first rotational force to the worm hub.

In an aspect, a sensor arranged to measure a distance the first leg or the second leg has traveled from a rest position or a number of rotations of the coupling shaft.

In an aspect, the sensor is connected the coupling shaft, the cross-shaft, the first leg gear, the second leg gear, the first leg, or the second leg.

In an aspect, the sensor is selected from: an angular position sensor, a gyroscope, an accelerometer, a magnetometer, a rotary encoder, an optical encoder, a Hall-effect sensor, a linear encoder, an ultrasonic sensor, a non-contact laser line distance sensor, a radio frequency sensor, a proximity sensor, a strain gauge, a force-sensitive load cell, or a capacitive load cell.

In an aspect, there is provided a method for actuating a landing gear system, the method including: applying a first rotational force via a motor to a landing gear actuator assembly having a worm gear and a clutch assembly; converting the first rotational force into rotational motion via at least the worm gear; applying a first input to the landing gear actuator assembly, where the first input is arranged to engage the clutch assembly to transfer the first rotational force to a first leg assembly; and raising or lowering a first leg of the first leg assembly.

In an aspect, the input is a pressurized air or a hydraulic fluid.

In an aspect, the clutch assembly transfers the first rotational force to the first leg assembly via a coupling shaft, the coupling shaft non-rotationally engaged with the clutch assembly.

In an aspect, the method further includes determining the first distance via a sensor arranged on the coupling shaft or the first leg assembly.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure describes various embodiments of actuators for landing gear systems for trailers. Specifically, a system and method are provided which include a landing gear actuator assembly arranged to transition, in response to a remote input, a first leg assembly and a second leg assembly from a retracted state to an expanded state and vice versa.

Figure 1:
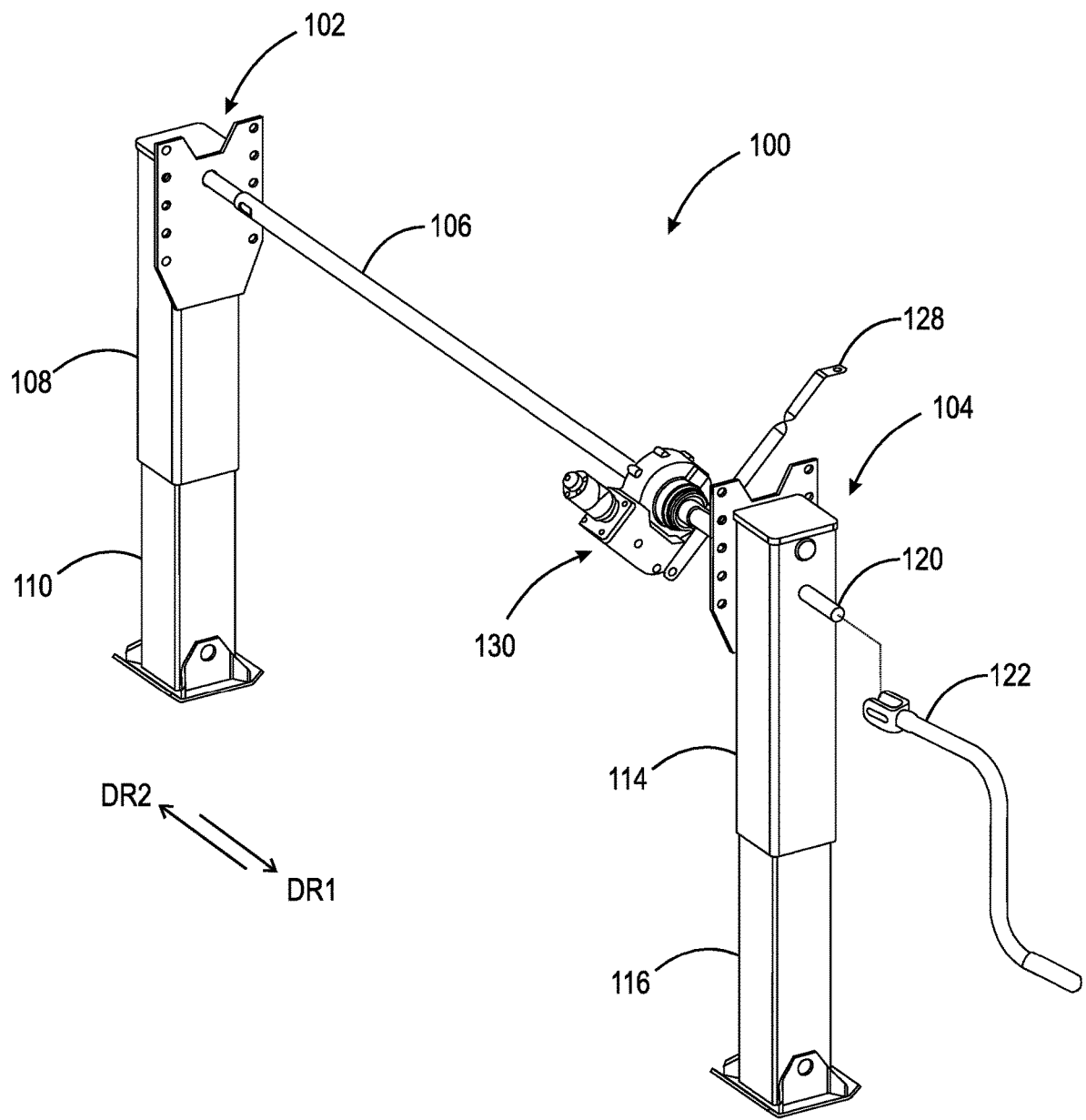
FIG. 1 is a perspective view of a landing gear system according to the present disclosure.
Figure 2A:
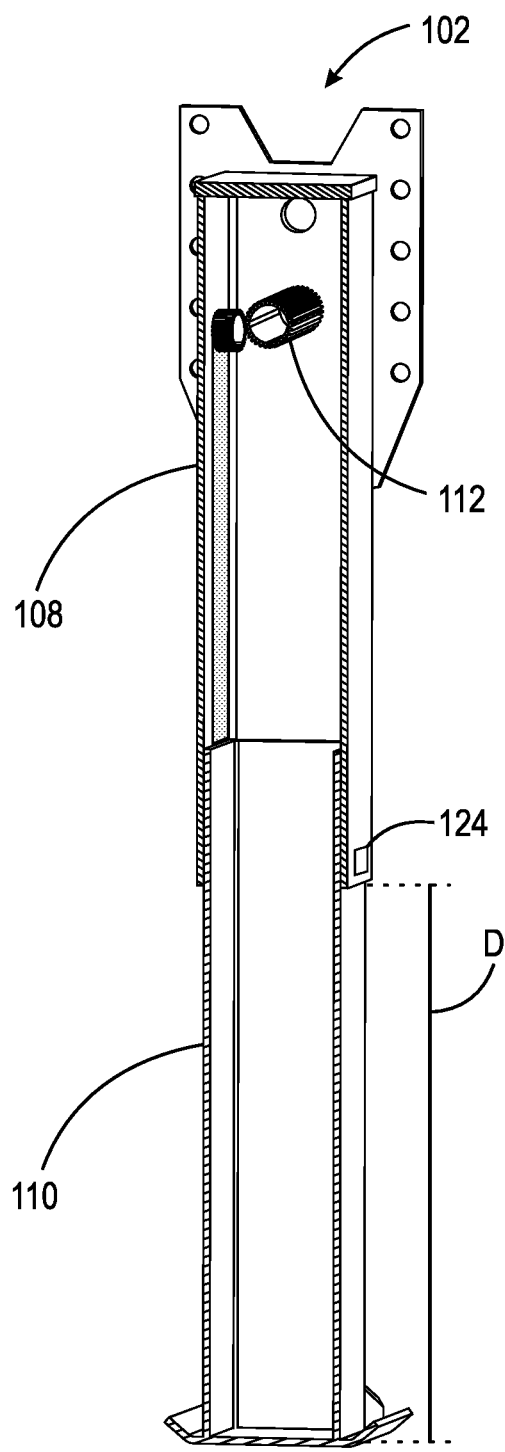
FIG. 2A is a cross-section view of a first leg assembly according to the present disclosure.
Figure 2B:
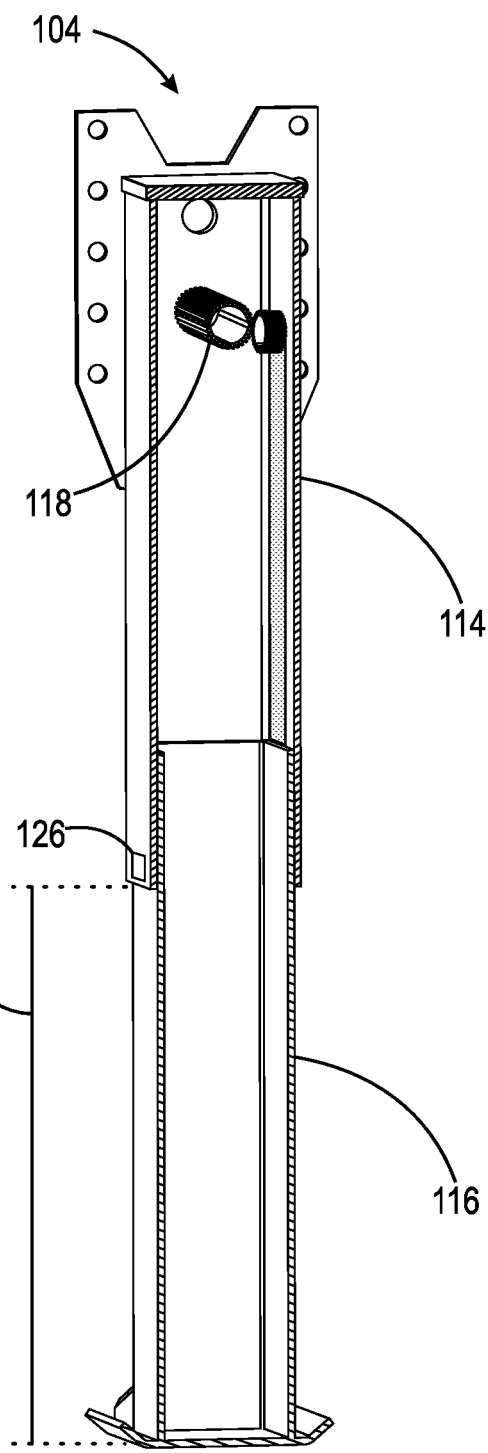
FIG. 2B is a cross-section view of a second leg assembly according to the present disclosure.

The following description should be read in view of FIGS. 1-2B. FIG. 1 illustrates a perspective view of landing gear system 100 according to the present disclosure. It should be appreciated that, although not illustrated for clarity, during operation of landing gear system 100, a trailer may be provided, where landing gear system 100 is fixedly secured to the underside of the trailer as will be described in detail below. Generally, landing gear system 100 includes first leg assembly 102, second leg assembly 104, and cross-shaft 106.

As illustrated in FIGS. 2A and 2B, which illustrate cross-sectional views of first leg assembly 102 and second leg assembly 104, respectively, first leg assembly 102 includes first leg housing 108, first leg 110, and first leg gear 112. First leg housing 108 is intended to be a substantially hollow longitudinal member arranged to telescopingly engage with first leg 110. First leg 110 is intended to fit within and slidingly engage with first leg housing 108 such that, when in the retracted state 190 (discussed below) a substantial portion of first leg 110 is arranged within first leg housing 108 and when in the expanded state 192 (discussed below) a substantial portion of first leg 110 is arranged outside of first leg housing 108. In other words, in the expanded state, first leg 110 has traveled a first distance D. First leg gear 112 is arranged between first leg 110 and cross-shaft 106 such that torque or rotational forces (e.g., first rotation force FR1, discussed below) can be transferred 90 degrees to first leg 110 when operating landing gear system 100 from the retracted state 190 to the expanded state 192.

Second leg assembly 104 includes second leg housing 114, second leg 116, and second leg gear 118. Second leg housing 114 is intended to be a substantially hollow longitudinal member arranged to telescopingly engage with second leg 116. Second leg 116 is intended to fit within and slidingly engage with second leg housing 114 such that, when in the retracted state 190 (discussed below) a substantial portion of second leg 116 is arranged within second leg housing 114 and when in the expanded state 192 (discussed below) a substantial portion of second leg 116 is arranged outside of second leg housing 114. In other words, in the expanded state second leg 116 has traveled a first distance D. Second leg gear 118 is arranged between second leg 116 and cross-shaft 106 (discussed below) such that torque or rotational forces (e.g., first rotation force FR1, discussed below) can be transferred 90 degrees to second leg 116 when operating landing gear system 100 from the retracted state 190 to the expanded state 192. It should be appreciated that first leg housing 108, first leg 110, second leg housing 114, and second leg 116 are intended to be made from an alloy steel or aluminum; however, it should be appreciated that any material having a sufficient load capacity to withstand the weight of a trailer under maximum load conditions can be utilized. Additionally, both first leg 110 and second leg 116 can terminate proximate the ground upon which the trailer is intended to sit when disconnected from the tractor. The terminal ends of each leg may include a foot as illustrated to disperse the weight of the trailer when in the expanded state as well as provide a level surface upon which the legs may stand.

Between first leg assembly 102 and second leg assembly 104, is cross-shaft 106. Cross-shaft 106 is arranged to accept a rotational force or torque from landing gear actuator assembly 130, discussed below, and transfer that rotational force equally to first leg assembly 102 and second leg assembly 104 via at least first leg gear 112 and second leg gear 118, respectively. It should be appreciated that more than one gear can be provided between each respective leg housing and each respective leg. Additionally, cross-shaft 106 is intended to be one continuous shaft, i.e., extending between first leg assembly 102 and second leg assembly 104, unbroken; however, it should be appreciated that cross-shaft 106 can include any combination of shafts which span the distance between first leg assembly 102 and second leg assembly 104, e.g., two or more shafts rotationally secured to each other. It should further be appreciated that landing gear actuator 130 can be arranged to engage with cross-shaft 106 at any point between first leg assembly 102 and second leg assembly 104, or outside of first leg assembly 102 or second leg assembly 104, e.g., on cross-shaft projection 120 as discussed below.

Cross-shaft 106 has a first end and a second end, e.g., where the first end is arranged proximate to first leg assembly 102 and second end is arranged proximate second leg assembly 104. Furthermore, a cross-shaft projection is provided, i.e., cross-shaft projection 120, which can be non-rotatingly engaged with the first end or the second end of cross-shaft 106. As illustrated in FIG. 1, cross-shaft projection 120 is non-rotatingly secured proximate to the second end of cross-shaft 106. Cross-shaft projection 120 is intended to project outwardly from second leg assembly such that an operator can attach a manual hand crank, i.e., crank handle 122. Crank handle 122 can be utilized by an operated when clutch assembly 162 is in a disengaged state 194 as discussed below.

Landing gear system 100 can also include at least one sensor, i.e., first sensor 124 and/or second sensor 126 (illustrated in FIGS. 2A-2B). First sensor 124 and/or second sensor 126 are arranged to gather position information associated with the position of, e.g., first leg 110 or second leg 116 with respect to a fixed component of landing gear system 100 or the trailer on which landing gear system 100 is attached. For example, first sensor 124 can be fixedly secured to first leg housing 108, first leg 108, first leg gear 112, cross-shaft 106, or coupling shaft 142. Additionally, first sensor 124 and second sensor 126 can be selected from: an angular position sensor, a gyroscope, an accelerometer, a magnetometer, a rotary encoder, an optical encoder, a Hall-effect sensor, a linear encoder, an ultrasonic sensor, a non-contact laser line distance sensor, a radio frequency sensor, a proximity sensor, a strain gauge, a force-sensitive load cell, a capacitive load cell, or any other sensor that can be utilized to derive the distance first leg 110 has traveled or derive the distance between the ground beneath first leg 110 and the first leg housing 108. Second sensor 126 can be positioned similarly with respect to second leg assembly 104.

Furthermore landing gear system 100 includes mounting member 128, and a landing gear actuator assembly 130, discussed in detail below. As illustrated in FIG. 1, mounting member 128 is a substantially longitudinal member arranged between the landing gear actuator assembly 130 and the trailer on which landing gear system 100 can be mounted. Landing gear assembly is arranged to provide rotational stability to landing gear actuator assembly with respect to cross-shaft 106.

Additionally, and although not illustrated, landing gear system 100 can also include a controller C arranged to send and receive electrical signals which can operate to remotely engage various aspects of the system. In one example, the controller includes a processor P and a memory M arranged to execute and store, respectively, at least a set of non-transitory computer-readable instructions I. Controller C is also arranged to receive a plurality of inputs and/or sensor data from the operator and/or sensors, respectively, to remotely engage various aspects of the system which will be discussed below in detail. In one example, controller C can be positioned within the cab of the tractor or on the exterior of the trailer for ease of use by the operator.

Figure 3:
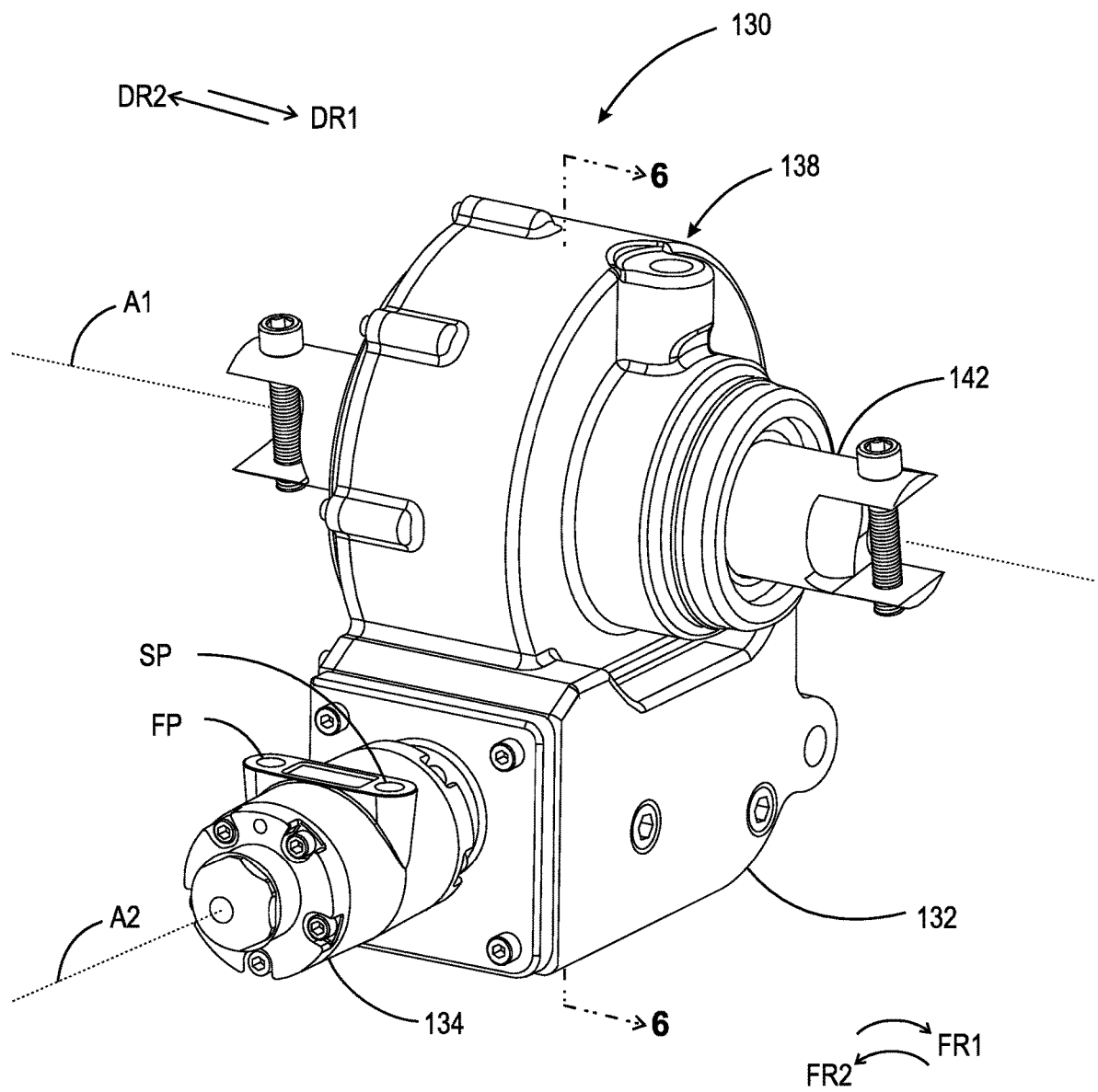
FIG. 3 is a perspective view of a landing gear actuator assembly according to the present disclosure.

FIG. 3 is a perspective view of landing gear actuator assembly 130 according to the present disclosure. Generally, landing gear actuator assembly 130 includes housing 132 and motor 134. Housing 132 includes cavity 134 (shown in FIGS. 4-5) and an input port, i.e., first input port 138 arranged to provide first input 140 (not shown). Housing 132 is configured such that it can receive and completely encompass at least worm hub 144, worm gear 146, and clutch assembly 162, discussed in detail below. Additionally, input port 138 is arranged as a projection, offset along first imaginary axis of rotation A1 (discussed below) and in first axial direction DR1 from worm hub 144, worm gear 146, and clutch assembly 162. First input 140 can be pressurized air or fluid, and, as will be discussed below in detail, can be used to actuate or switch landing gear actuator assembly 130 and/or clutch assembly 162 from engaged state 196 to disengaged state 194 or vice versa. Motor 134 is fixedly secured to housing 132 and arranged to produce, e.g., a first rotational force FR1 in response to an input, e.g., a pneumatic air supply. In one example, pneumatic air supply lines can run from a tank of compressed air located on a tractor or on the trailer for use by the operator. As can be seen in FIG. 3, two ports are provided on motor 134 such that when the pneumatic air supply is provided to one port, e.g., first port FP, motor 134 can provide a rotational force in one rotational direction, i.e., first rotational force FR1 and when the pneumatic air supply is provided to the other port, e.g., second port SP, motor 134 produces a rotational force in the opposite rotational direction, i.e., second rotational force FR2.

FIG. 3 also illustrates the position of coupling shaft 142. Coupling shaft 142 is arranged to project through housing 132 about first imaginary rotational axis A1 and is substantially hollow such that cross-shaft 106 can be positioned radially within coupling shaft 142 during operation of landing gear system 100. To that end, coupling shaft 142 has a first end and a second end, e.g., the first end of coupling shaft 142 is arranged to project toward first leg assembly 102 and the second end of coupling shaft 142 is arranged to project toward second leg assembly 104. As illustrated, the first end of coupling shaft 142 may include a first through-bore and a first fastener arranged to engage the first end of coupling shaft 142 with cross-shaft 106 (as shown generally in FIG. 1) Similarly, the second end of coupling shaft 142 may include a second through-bore and a second fastener arranged to engage the second end of coupling shaft 142 with cross-shaft 106. Although illustrated as a threaded bolt, it should be appreciated that the first and second fasteners can be any fastener capable of coupling cross-shaft 106 and coupling shaft 142 such that they rotate together during operation of landing gear system 100. Advantageously, the fastener and through-bore arrangement for securing coupling shaft 142 to cross-shaft 106, allows landing gear actuator assembly 130 to be mountable through and about any existing shaft anywhere on the tractor or the trailer. Additionally, as landing gear actuator assembly 130 can easily be mounted on or removed from any existing shaft, the assembly can remain with any particular trailer throughout its lifespan including upgrades to the landing gear system itself, i.e., landing gear actuator assembly 130 can simply by mounted about any new cross-shaft. Furthermore, as the assembly may mount to any shaft, the landing gear actuator assembly may also be retrofitted through and about other shafts on the trailer, e.g., drive shafts for trailer tarping systems designed for covering the exposed beds and/or the materials loaded onto the beds of dump trucks.

Figure 4:
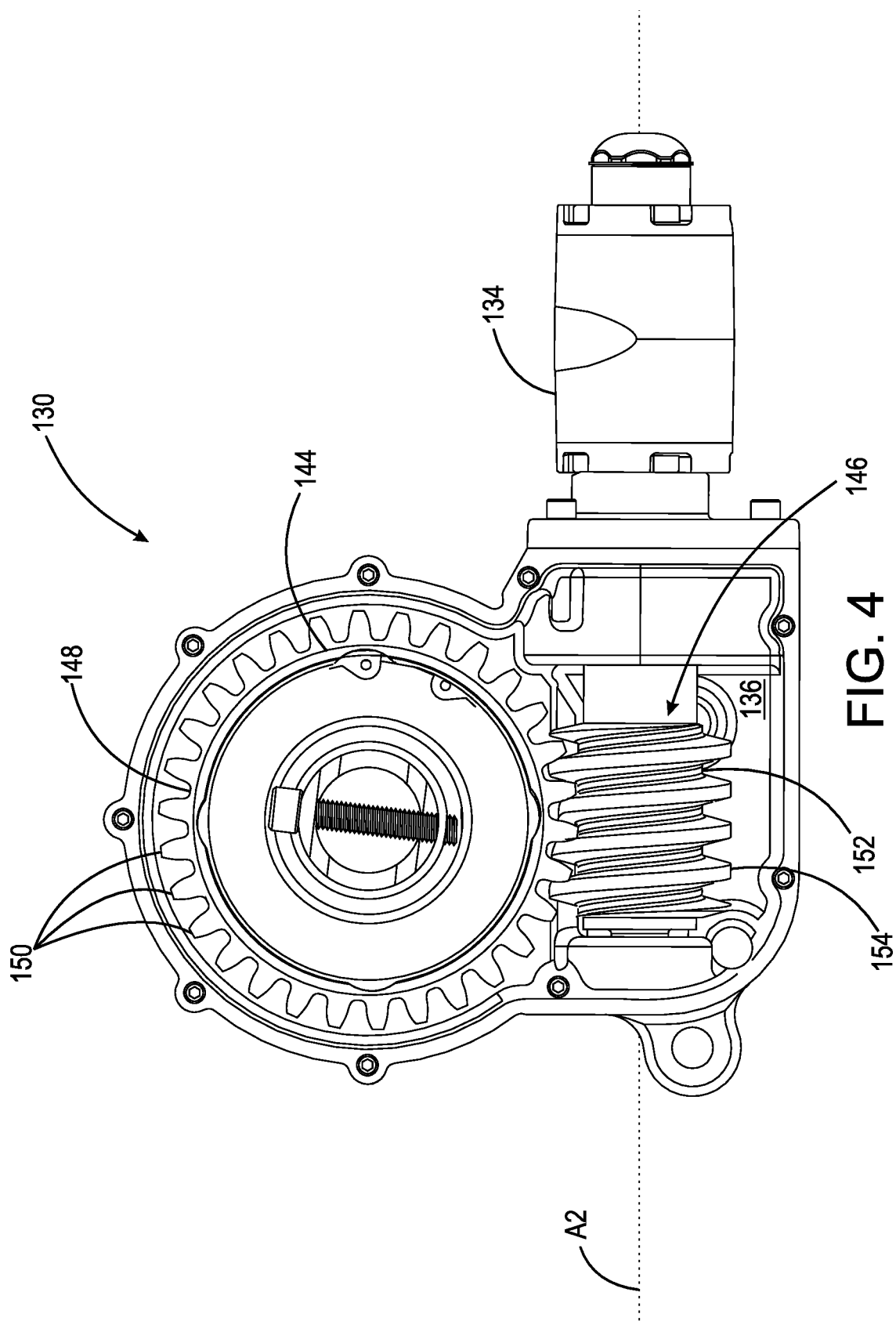
FIG. 4 is a left-side elevational view of a landing gear actuator assembly according to the present disclosure.

FIG. 4 illustrates a side view of landing gear actuator assembly 130 with a side of housing 132 removed. Within cavity 136 of housing 132, landing gear actuator assembly 130 further includes worm hub 144 and worm gear 146. Worm hub 144 includes an outer circumferential surface, i.e., first outer circumferential surface 148, where first outer circumference 148 includes first plurality of gear teeth 150 arranged thereon. Although first plurality of gear teeth 150 is illustrated as trapezoidal prisms equally spaced from each other about first outer circumferential surface 148, it should be appreciated that first plurality of gear teeth 150 can take any conceivable shape, and/or be spaced apart from each other in any conceivable distance or pattern.

Figure 5:
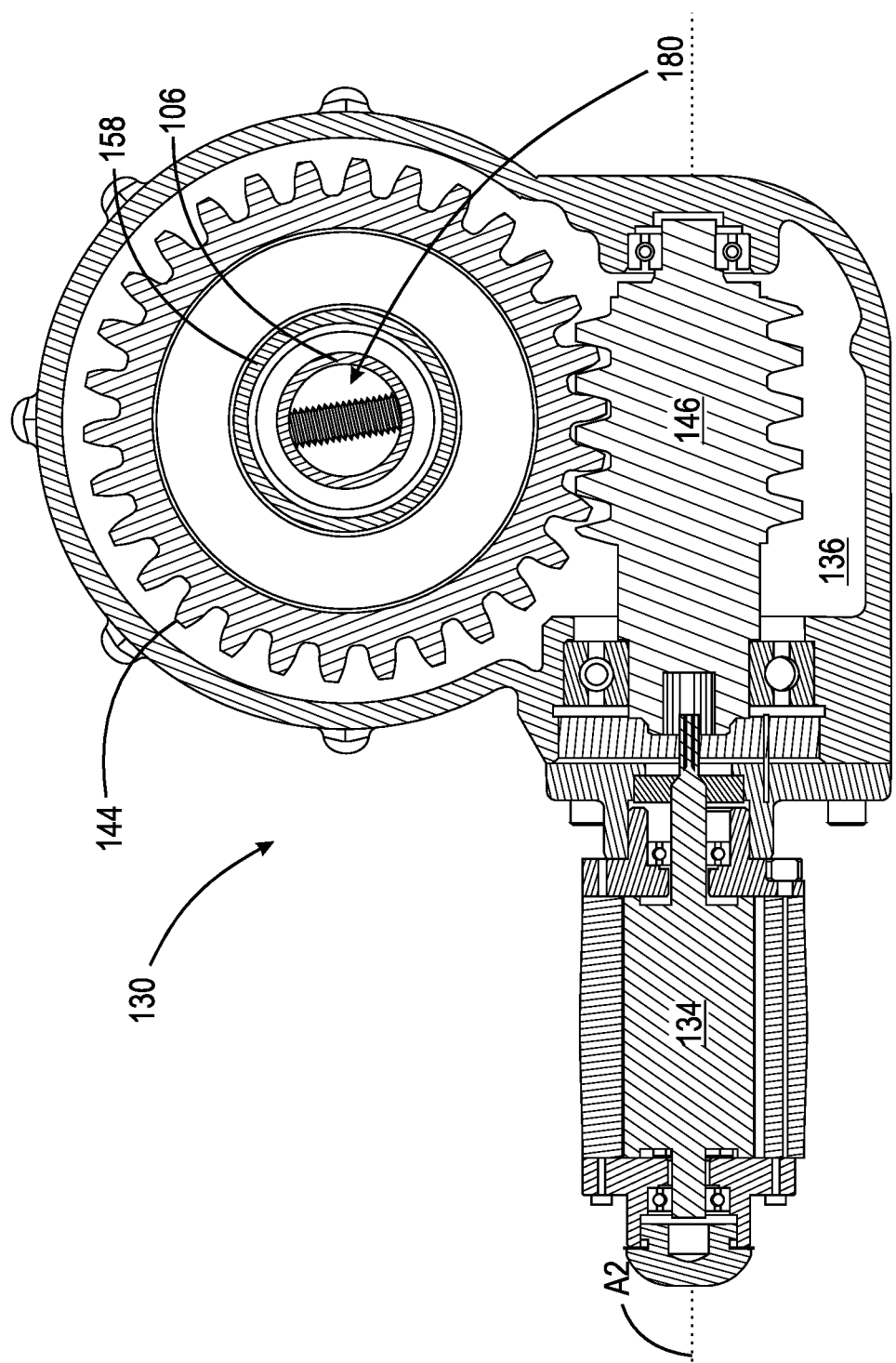
FIG. 5 is a right-side cross-sectional view of a landing gear actuator assembly according to the present disclosure.

Worm gear 146 includes an outer circumferential surface, i.e., second outer circumferential surface 152 which includes at least one gear tooth, i.e., first gear tooth 154. As illustrated in FIG. 4, first gear tooth 154 is intended to be a single helical tooth arranged about worm gear 146 such that as worm gear 146 rotates about second imaginary rotational axis A2, first gear tooth 154 is continually in contact with at least one gear tooth of first plurality of gear teeth 150 of worm hub 144. During operation of landing gear actuator assembly 130, motor 134 is arranged to produce a first torque or first rotational force FR1 about second imaginary rotational axis A2 and first gear tooth 154 is arranged to transfer first rotational force 90 degrees via contact with first plurality of gear teeth 150 causing rotation of worm hub 144 about first imaginary rotational axis A1. It should be appreciated that the outer circumferential surfaces of worm gear 146 and worm hub 144 can take any shape capable of transferring torque directly or transferring torque 90 degrees, e.g., the outer circumference of worm gear 146 may take the form of a pinion and the outer circumference of worm hub 144 may take the form or a ring gear where the connection between worm gear 146 and worm hub 146 forms a ring and pinion gear arrangement which transfers torque 90 degrees from the motor. In an embodiment where a ring and pinion gear arrangement is utilized a lower speed, higher toque motor would be required, e.g., an electric motor as discussed below. FIG. 5 illustrates a right-side cross-sectional view taken down the center of landing gear actuator assembly 130 as illustrated in FIG. 3.

Figure 6:
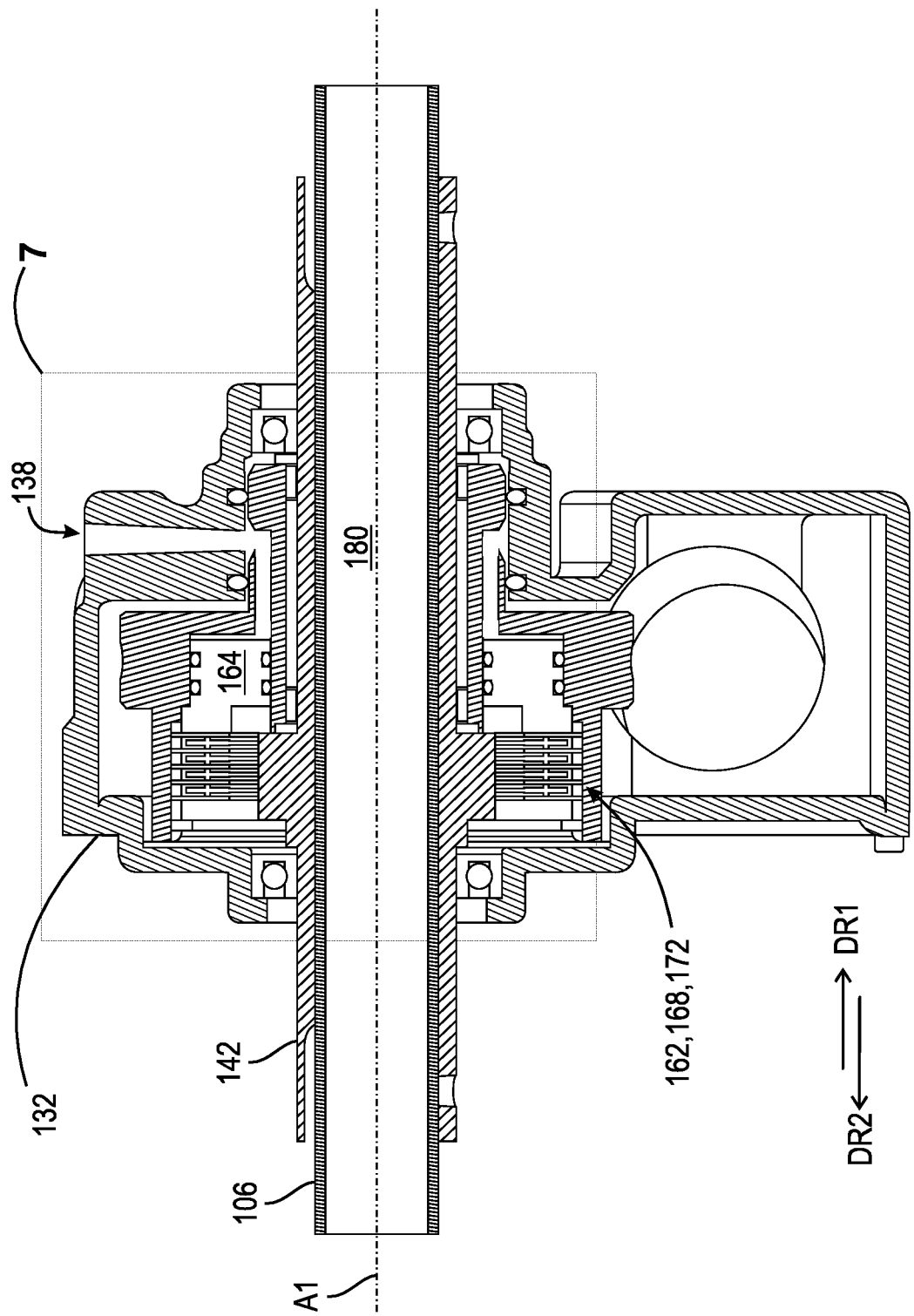
FIG. 6 is a cross-section view of the landing gear actuator assembly taken generally along line 6-6 in FIG. 3.
Figure 7:
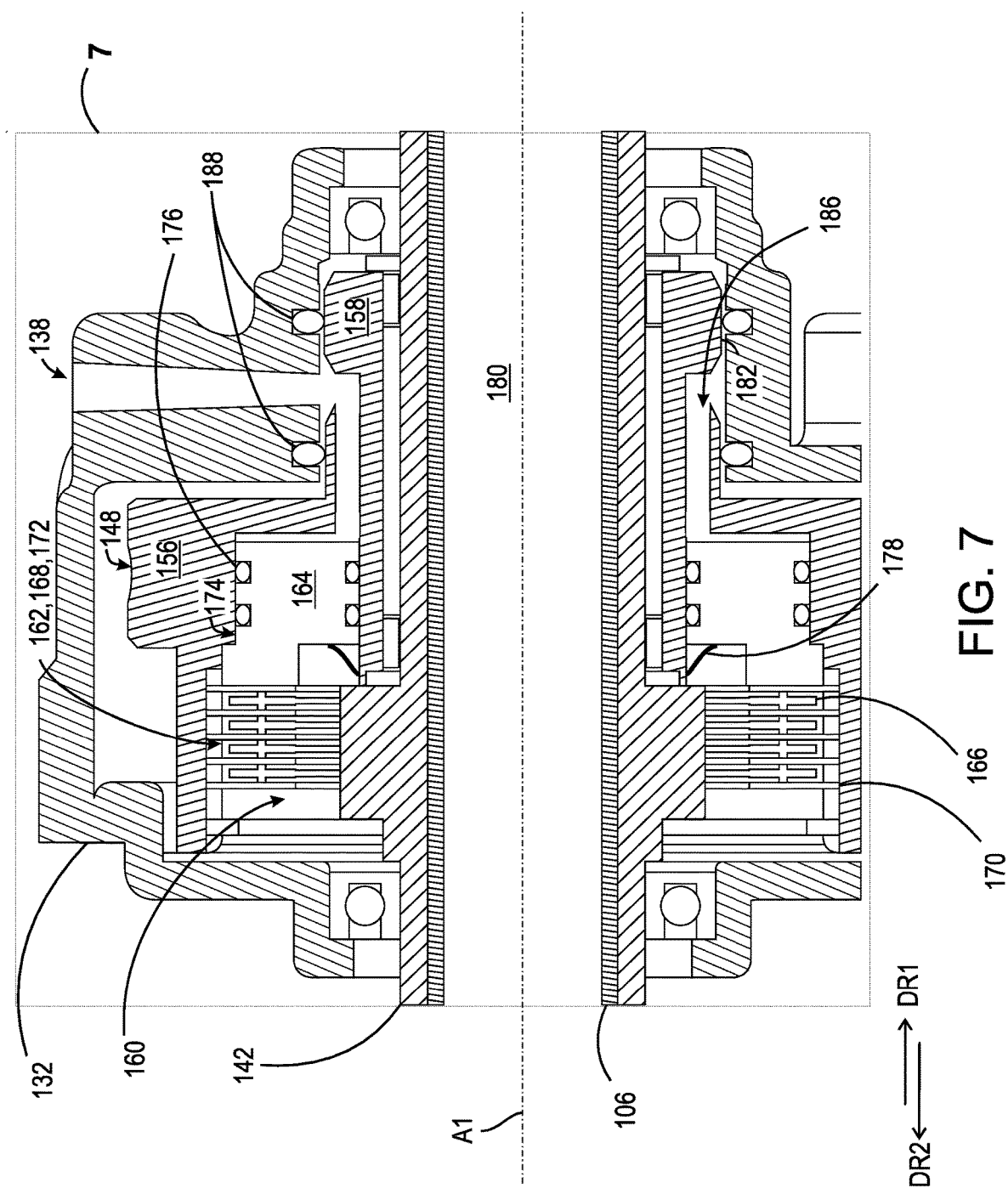
FIG. 7 is a detail view of section 7 illustrated in FIG. 6.

FIG. 6 illustrates a cross-sectional view of landing gear actuator assembly 130 taken down the center of landing gear actuator assembly 130 illustrated in FIG. 3. FIG. 7 illustrates a detail view of portion 7 illustrated in FIG. 6. As illustrated in FIGS. 6-7, worm hub 144 includes first axial worm hub portion 156 and second axial worm hub portion 158. First axial worm hub portion 156 is integrally connected with second axial worm hub portion 158 such that first axial worm hub portion 156 is positioned in first axial direction DR1 with respect to second axial worm hub portion 158. Furthermore, first axial worm hub portion 156 and second axial worm hub portion 158 are arranged to rotate about first imaginary rotational axis A1 during operation of landing gear actuator assembly 130. First axial worm hub portion 156 includes an annular recess, i.e., annular recess 160. Annular recess 160 of first axial worm hub portion 156 is arranged to at least partially encompass clutch assembly 162 and piston-clutch actuator 164. Clutch assembly 162 includes at least one plate, i.e., first clutch plate 166 of plurality of clutch plates 168, and at least one friction disc, i.e., first friction disc 170 of plurality of friction discs 172. Each clutch plate of plurality of clutch plates 168 are fixedly engaged with coupling shaft 142 and are arranged to rotate as one unit. Additionally, each friction disc of plurality of friction discs 172 are fixedly secured to the inner circumferential surface of first axial worm hub portion 156. In this arrangement, when sufficient friction occurs between the clutch plates and the friction discs, rotational motion of worm hub 144 can be transferred from worm hub 144 to coupling shaft 142. Although illustrated with a plurality of clutch plates 168 and plurality of friction discs 172, it should be appreciated that only one clutch plate 166 and only one friction disc 170 are necessary to couple worm hub 144 and coupling shaft 142. It should be further be appreciated that clutch assembly 162 can be a wet clutch, i.e., provided with a liquid lubricant, or a dry clutch, i.e., provided without any lubricant.

To create the frictional force between the plurality of clutch plates 168 and plurality of friction discs 172, there is provided a piston-clutch actuator, i.e., piston-clutch actuator 164. Piston-clutch actuator 164 is substantially annular in shape and is positioned about first imaginary rotational axis A1 within annular recess 160 of first axial worm hub portion 156 in second axial direction DR2 with respect to clutch assembly 162. Piston-clutch actuator 164 includes an outer circumferential surface, i.e., third outer circumferential surface 174 which includes at least one annular sealing member, i.e., first annular sealing member 176A and second annular sealing member 176B. First annular sealing member 176A and second annular sealing member 176B are intended to be a torus shaped sealing member, e.g., an O-ring made of rubber or elastomer material and creates a fluid and/or air-tight seal between third outer circumferential surface 174 and the inner circumferential surface of first axial worm hub portion 156. It should be appreciated that first annular sealing member 176A and second annular sealing member 176B can be positioned around third circumferential surface 174 or may be seated within annular recesses along third circumferential surface 174 as illustrated in FIGS. 6-7. Furthermore, within annular recess 160 of first axial worm hub portion 156, there is provided a first resilient member, i.e., first resilient member 178, and, as discussed below in detail, first resilient member 178 is arranged to bias piston-clutch actuator 164 in second axial direction DR2 during operation of landing gear actuator assembly 130. First resilient member 178 is intended to be a spring or other biasing element which can create a constant force upon piston-clutch actuator 164 in second axial direction DR2. It should be appreciated that, although illustrated in FIGS. 6-7 as being fixedly secured to coupling shaft 142, first resilient member 178 can be arranged on first axial worm hub portion 156, or any other body which remains axially fixed, i.e., does not move in first axial direction DR1 or second axial direction DR2, during operation of landing gear actuator assembly 130.

As recited above, worm hub 144 includes second axial worm hub portion 158. Arranged through second axial worm hub portion 158 is a through-bore, i.e., first through-bore 180. First through-bore 180 is arranged to rotate about first imaginary rotational axis A1 and has a diameter such that both cross-shaft 106 and coupling shaft 142 can rotate within first through-bore 180. Second axial worm hub portion 158 further includes an outer circumferential surface, i.e., fourth outer circumferential surface 182. Fourth outer circumferential surface 182 includes annular groove 184. Additionally, second axial worm hub portion 158 includes a plurality of channels 186. Plurality of channels 186 are arranged within second axial worm hub portion 158 longitudinally, i.e., along first imaginary rotational axis A1 and are in fluid communication with annular groove 184 and first input port 138 such that first input 140 can flow from first input port 138 through annular groove 184 and subsequently through each channel of plurality of channels 186. About fourth outer circumferential surface 182 is a second annular sealing member, i.e., second annular sealing member 188. Second annular sealing member 188 is also arranged such that each side of the seal is positioned on either side of annular groove 184, i.e., in the first axial direction DR1 and the second axial direction DR2 with respect to annular groove 184. Second annular sealing member is intended to be a rotary union seal or any combination of sealing members that allow first input 140 to engage and flow into annular groove 184 while preventing first input 140 from leaking outward around fourth outer circumferential surface 182.

It should be appreciated that, although illustrated as a pneumatic motor, motor 134 can, in the alternative, be electric motor, i.e., any motor capable of creating rotation with sufficient torque to operate the components of landing gear actuator assembly 130 as discussed above. Additionally, it may be desirable, if using an electric motor, to also provide a way to engage clutch assembly 162 via electromechanical means. For example, in addition to an electric motor 134, an electric clutch may be provided within worm hub 144 which functions similarly to electric clutches used in electromagnetic Power Takeoff systems for outdoor equipment, i.e., a clutch which can utilize an electric input from an electric power source, and magnetically energize at least one clutch plate within clutch assembly 162 such that, when energized, an electromagnet will attract the at least one clutch plate and couple the input to the output by create sufficient friction and/or magnetic attraction between at least one plate 166 and the electromagnet so that torque can be transferred to coupling shaft 142 and cross-shaft 106.

The following description should be read in view of FIGS. 1-7. During operation of a tractor trailer, the operator may wish to utilize the landing gear system 100 disclosed herein to actuate first leg assembly 102 and second leg assembly from a retracted state 190 to an expanded state 192, i.e., from a position where a substantial portion of first leg 110 and second leg 116 are within first leg housing 108 and second leg housing 114, respectively (retracted state 190), to a position where a substantial portion of first leg 110 and second leg 116 are arranged outside of first leg housing 108 and second leg housing, respectively (expanded state 192). Prior to use, clutch assembly 162 begins in the disengaged state 194 as will be discussed below. In this state, the operator may, for example, provide an input to controller C, described above, which indicates to landing gear system 100 that an air supply should be provided to one of the two input ports of motor 134, e.g., first port FP. In response to this signal, the supply tank located on the tractor or the trailer provides a supply of compressed air to motor 134 causing it to spin and produce first rotational force FR1 about second imaginary rotational axis A2. First rotational force FR1 is transferred to worm gear 146 causing worm gear 146 to rotate about second imaginary rotational axis A2. As worm gear 146 rotates, first gear tooth 154 of worm gear 146 engages with first plurality of gear teeth 150 located on first outer circumferential surface 148 of first axial worm hub portion 156 of worm hub 144, effectively transferring the torque produced by first rotational force FR1 90 degrees to worm hub 144, such that worm hub 144 begins to rotate about first imaginary rotational axis A1.

As worm hub 144 begins to rotate and build up rotational speed, i.e., revolutions per minute (RPMs), a second input may be provided manually or automatically via controller C to provide first input 140 to first input port 138. As recited above, first input 140 may be air or fluid supplied by a supply tank located on the tractor or the trailer and in communication with first input port 138. In one example, first input 140 is compressed air. Once worm hub 144 reaches a predetermined RPM, which can be selected from a range of RPM and/or determined by waiting a predetermined amount of time after motor 134 is actuated, or by sensing motor speed or worm hub revolutions directly via sensors, first input 140 can be supplied to input port 138. First input 140 is arranged to travel through input port 138 and into annular groove 184 of second axial worm hub portion 158 of worm hub 144. First input 140 is prevented from leaking into other areas of the landing gear actuator assembly 130 via second annular sealing member 188. Additionally, as first input 140 is continually provided, first input 140 is also arranged to travel down plurality of channels 186 and be directed at piston-clutch actuator 164 which is being biased in second axial direction DR2 by resilient member 178. Once a sufficient amount of pressure from first input 140 is applied to piston-clutch actuator 164 such that the force from the pressure in the first axial direction DR1 exceeds the biasing pressure in the second axial direction DR2, piston-clutch actuator 164 is arranged to translate about first imaginary rotational axis A1 in first axial direction DR1 and apply a compression force between each clutch plate 166 of plurality of clutch plates 168 and each friction disc 170 of plurality of friction discs 172 of clutch assembly 162. When sufficient force is placed on piston-clutch actuator 164 such that it compresses the respective clutch plates and friction discs of clutch assembly 162, clutch assembly 162 is in an engaged state.

In the engaged state 196, rotation of the worm hub 144 is transferred from plurality of friction discs 170, which are engaged with the inner circumferential surface of first axial worm hub portion 156 within annular recess 160, to each respective clutch plate 166 of plurality of clutch plates 168 fixedly secured to coupling shaft 142. Thus, whether landing gear actuator assembly 130 is in engaged state 196 or disengaged state 194 can be determined by whether first input 140 is supplied or not supplied. When landing gear actuator assembly 130 is in engaged state 196, the rotational force created by motor 134 is transferred through worm gear 146 to worm hub 144, through clutch assembly 162 to coupling shaft 146, which in-turn transfers the rotational force to cross-shaft 106 of landing gear system 100. From cross-shaft 106 the rotational force can be transferred through first leg gear 112 of first leg assembly 102 and second leg gear 118 of second leg assembly 104 to first leg 110 and second leg 116, respectively, causing each leg to transition from retracted state 190 to expanded state 192. Additionally, by switching which port used on motor 134, i.e., switching from supplying motor 134 via first port FP to supplying motor 134 via second port SP, the second rotational force FR2 produced will be transferred through the same components discussed above ultimately causing first leg gear 112 and second leg gear 118 to rotate in the opposite direction, bringing first leg 110 and second leg 116 from the expanded state 192 to the retracted state 190.

As discussed above, sensors, i.e., first sensor 124 and second sensor 126 may be provided on any fixed component of landing gear system 100 or any component that rotates within landing gear system 100. In one example, first sensor 124 may be a linear encoder arranged to provide sensor data to controller C and may be located on a fixed component of first leg assembly 102, e.g., first leg housing 108. As input 140 is supplied via input port 138 to landing gear actuator assembly 130, the pressure created will cause piston-clutch actuator 164 to translate into the engaged state 196. As described above, the rotational force produced by the system is transferred to the first leg assembly 102 and second leg assembly 104 via cross shaft 106, causing first leg 110 and second leg 116 to translate from the retracted state 190 to the expanded state 192. As first leg and second leg 116 move between these states, first sensor, i.e., a linear encoder can measure the distance traveled by first leg 110 with respect to the position on which it is fixed, i.e., first leg housing 108. First sensor 124 can be arranged to transmit this sensor data to controller C which can automatically discontinue the supply of first input 140, reverting the assembly to the disengaged state 194 when first leg 110 is close to the ground beneath which the trailer is positioned. Thus, the distance traveled by the legs can be measured and stored in controller C which can in-turn be used by the system to prevent over extension of the legs during operation of landing gear system 100. Conversely, the sensors, i.e., first sensor 124 and/or second sensor 126 can be used to prevent over contraction of the legs when the system is transitioning from the expanded state 192 to the retracted state 190. It should be appreciated that depending on the type of sensor chosen, sensor 124 and/or sensor 126 can provide linear distance measurements between fixed components of the system and/or rotational measurements between a fixed component and a rotating component of the system, e.g., rotational type sensor can count the number of rotations or revolutions in a given time period and directly calculate distance traveled by first leg 110 and second leg 116. Furthermore, direct measurement sensors can be used, for example, ultrasonic sensors or proximity sensors can be used to measure the distance between first leg 110 and/or second leg 116 and the ground, or between first leg 110 and/or second leg 116 and the first leg housing 108 and second leg housing 114, respectively.

Advantageously, should any aspect or component of the foregoing landing gear actuator assembly fail, the operator can utilize an external manual hand crank, i.e., hand crank 122 to manually rotate cross-shaft 106 to transition the landing gear system 100 from the retracted state 190 to the expanded state 192 or vice versa.

Some additional advantages of the foregoing system include the ability to remotely, i.e., via pneumatic air supply systems, control or actuate the legs of a landing gear system quickly, i.e., faster than traditional methods, e.g., strictly with the use of a hand crank. Moreover, the ability to sense using first sensor 124 and/or second sensor 126 the distance traveled for first leg 110 and second leg 116 allows for complete automation of the landing gear between states. Furthermore, by removing the need for manual operation, risk of injury to the operator of the tractor is reduced if not completely eliminated.

Figure 8:
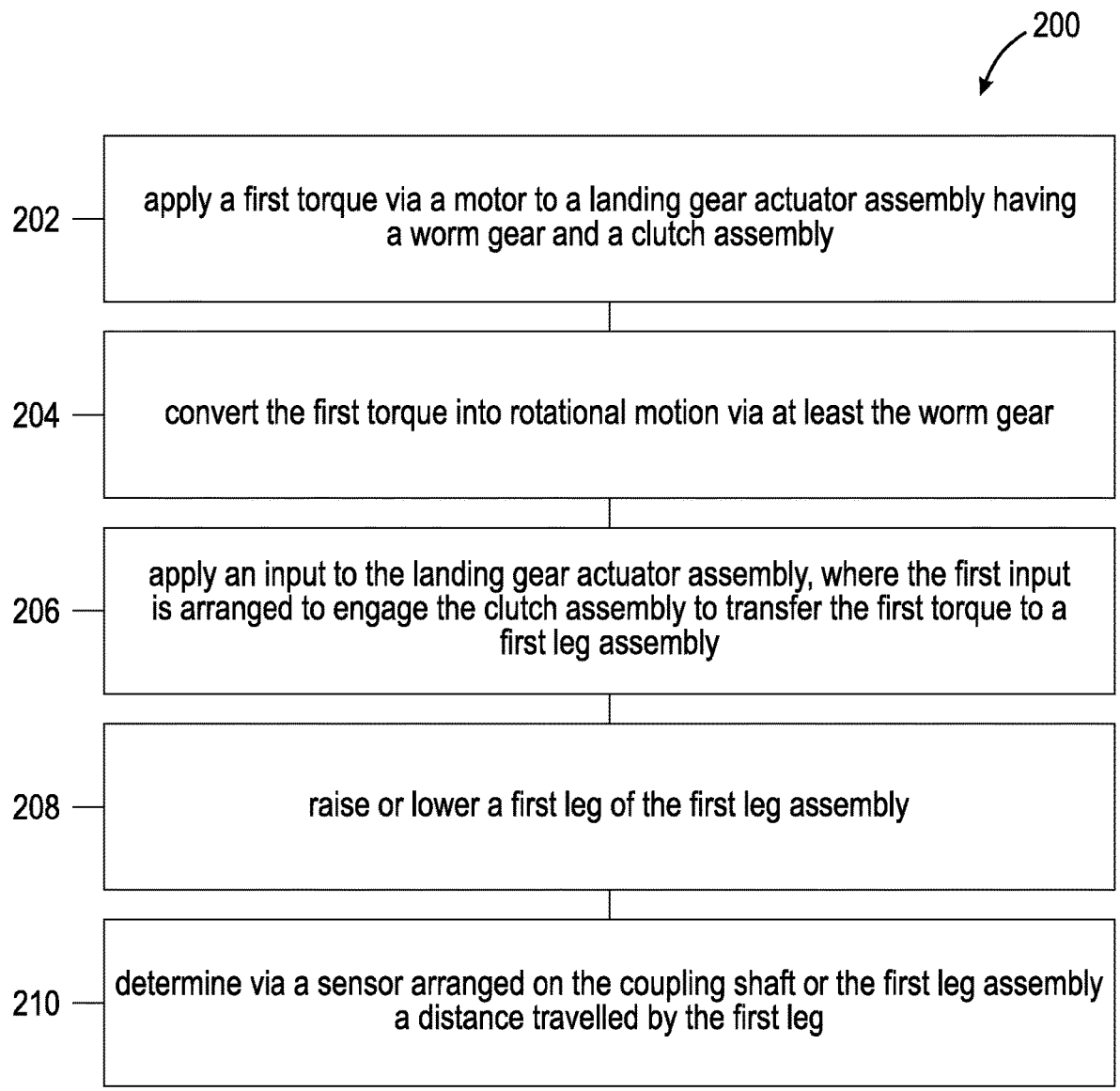
FIG. 8 is a flow chart illustrated the steps of a method according to the present disclosure.

FIG. 8 illustrates the steps of the method according to the present disclosure, i.e., method 200. Method 200 includes, for example: applying a first rotational force FR1 via a motor 134 to a landing gear actuator assembly 130 having a worm gear 146 and a clutch assembly 162 (step 202); converting the first rotational force FR1 into rotational motion via at least the worm gear 146 (step 204); applying a first input 140 to the landing gear actuator assembly, where the first input 140 is arranged to engage the clutch assembly 162 to transfer the first rotational motion FR1 to a first leg assembly 102 (step 206); raising or lowering a first leg 110 of the first leg assembly 102 (step 208); and determining via a sensor 124 arranged on the coupling shaft 142 or the first leg assembly 102 a distance D traveled by the first leg 110 (step 210).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A landing gear actuator assembly, comprising:
    a housing having a cavity, the cavity comprising;
        a worm hub operatively arranged to rotate about a first imaginary rotational axis and within the cavity of the housing, the worm hub having a first outer circumferential surface having a first plurality of gear teeth arranged thereon, a first through-bore substantially parallel with the first imaginary rotational axis, a first axial worm hub portion, and a second axial worm hub portion, the first axial worm hub portion further comprising an annular recess arranged about the first imaginary rotational axis, and the second axial worm hub portion comprising the first through-bore;
        a worm gear having a second outer circumferential surface having at least one gear tooth arranged to engage with the first plurality of gear teeth of the worm hub; and,
    a coupling shaft arranged through the housing and within the first through-bore of the worm hub and substantially parallel to the first imaginary rotational axis;
    a motor arranged to provide a first rotational force to the worm gear; and,
    wherein, the first rotational force of the motor induces a rotation of the worm gear within the housing and transfers the first rotational force to the worm hub, and
    wherein the housing further comprises a first input port for receiving a first input.

2. The landing gear actuator assembly of claim 1, wherein the coupling shaft further includes a first sensor arranged to measure the number of rotations of the coupling shaft.

3. The landing gear actuator assembly of claim 1, wherein the annular recess comprises a clutch assembly, the clutch assembly comprising a first plate and a first friction disc.

4. The landing gear actuator assembly of claim 3, wherein the coupling shaft is non-rotatingly engaged with the first plate of the clutch assembly.

5. The landing gear actuator assembly of claim 4, wherein the annular recess of the first axial worm hub portion further comprises a piston-clutch actuator displaceable in a first axial direction parallel with the first imaginary rotational axis and arranged to impart a first axial force on the clutch assembly.

6. The landing gear actuator assembly of claim 5, wherein the worm hub or the coupling shaft further comprises a resilient member arranged to impart a second axial force opposite the first axial force on the piston-clutch actuator in a second axial direction opposite the first axial direction.

7. The landing gear actuator assembly of claim 5, wherein the piston-clutch actuator comprises a third outer circumferential surface, wherein the third outer circumferential surface comprises a first annular sealing member.

8. The landing gear actuator assembly of claim 6, wherein the second axial worm hub portion further comprises a fourth outer circumferential surface, the fourth outer circumferential surface having an annular groove arranged thereon, the annular groove arranged to receive the first input from the first input port of the housing.

9. The landing gear actuator assembly of claim 8, wherein the second axial worm hub portion further comprises at least one channel arranged between the annular groove of the second axial worm hub portion and the annular recess of the first axial worm hub portion.

10. The landing gear actuator assembly of claim 8, wherein the second axial worm hub portion further includes a second annular sealing member about the fourth outer circumferential surface and in the first axial direction with respect to the annular groove, and a third annular sealing member arranged about the fourth outer circumferential surface and in a second axial direction where the second axial direction is opposite the first axial direction.

11. A landing gear system, the system comprising:
    a first leg assembly, the first leg assembly comprising:
        a first leg housing;
        a first leg arranged to telescopingly engage with the first leg housing; and,
        a first leg gear arranged to transfer a rotational motion to the first leg; and,
    a second leg assembly, the second leg assembly comprising:
        a second leg housing;
        a second leg arranged to telescopingly engage with the second leg housing; and,
        a second leg gear arranged to transfer the rotational motion to the second leg; and,
    a cross-shaft arranged between the first leg assembly and the second leg assembly; and,
    a landing gear actuator assembly secured to the first leg assembly, the second leg assembly, or the cross-shaft the landing gear actuator assembly comprising:
    a housing having a cavity, the cavity comprising:
    a worm hub operatively arranged to rotate about a first imaginary rotational axis and within the cavity of the housing, the worm hub having a first outer circumferential surface having a first plurality of gear teeth arranged thereon, a first through-bore substantially parallel with the first imaginary rotational axis, a first axial worm hub portion, and a second axial worm hub portion, the first axial worm hub portion further comprising an annular recess arranged about the first imaginary rotational axis, and the second axial worm hub portion comprising the first through-bore;

a worm gear having a second outer circumferential surface having at least one gear tooth arranged to engage with the first plurality of gear teeth of the worm hub; and, a motor arranged to provide a first rotational force to the worm gear; and, a coupling shaft through the housing and within the first through-bore of the worm hub and substantially parallel to the first imaginary rotational axis, wherein the coupling shaft is arranged to couple and decouple the motor from the cross-shaft;

wherein, the first rotational force of the motor induces a rotation of the worm gear within the housing and transfers the first rotational force to the worm hub, and wherein the housing further comprises a first input port for receiving a first input.

12. The landing gear system of claim 11, further comprises a sensor arranged to measure a distance the first leg or the second leg has travelled from a rest position or a number of rotations of the coupling shaft.

13. The landing gear system of claim 12, wherein the sensor is connected the coupling shaft, the cross-shaft, the first leg gear, the second leg gear, the first leg, or the second leg.

14. The landing gear system of claim 12, wherein the sensor is selected from: an angular position sensor, a gyroscope, an accelerometer, a magnetometer, a rotary encoder, an optical encoder, a Hall-effect sensor, a linear encoder, an ultrasonic sensor, a non-contact laser line distance sensor, a radio frequency sensor, a proximity sensor, a strain gauge, a force-sensitive load cell, or a capacitive load cell.

* * * * *